United States Patent [19]
Wright

[11] 3,982,408
[45] Sept. 28, 1976

[54] FLEXIBLE GEAR COUPLING HAVING A SHEAR SPACER AND SLEEVE CAPTURING MEANS

[75] Inventor: John Wright, Baltimore, Md.
[73] Assignee: Koppers Company, Inc., Pittsburgh, Pa.
[22] Filed: May 13, 1975
[21] Appl. No.: 577,060

[52] U.S. Cl. .................................... 64/9 R; 64/61; 64/28 R
[51] Int. Cl.² ........................................ F16D 3/18
[58] Field of Search .................. 64/9 R, 9 A, 6, 28, 64/14

[56] References Cited
UNITED STATES PATENTS

| | | | |
|---|---|---|---|
| 1,740,617 | 12/1929 | Morgan | 64/9 R |
| 1,770,743 | 7/1930 | Morgan | 64/9 R |
| 1,978,209 | 10/1934 | Kuhns | 64/9 |
| 3,200,616 | 8/1965 | Hawkins | 64/28 R |
| 3,855,818 | 12/1974 | Hochrevtcz | 64/28 R |

Primary Examiner—Samuel Scott
Assistant Examiner—Randall Heald
Attorney, Agent, or Firm—Oscar B. Brumback

[57] ABSTRACT

Herein disclosed is a flexible gear type coupling for connecting a pair of substantially coaxially aligned shafts to transmit torque therebetween. The flexible coupling comprises a hub having external gear teeth surrounding an outer portion thereof and rotatably connected to one of the shafts. A sleeve surrounds the hub and has internal gear teeth surrounding an inner portion thereof and in meshing engagement with the external gear teeth of the hub. A shear spacer is connected between the sleeve and the other of the shafts for transmitting torque from the one shaft to the other shaft. The shear spacer is adapted to shear when excessive torque is applied thereto for protecting the coupling from being damaged from the excessive torque. A capturing device is interposed between the hub and the sleeve for maintaining the sleeve substantially concentric about the hub upon shearing of the shear spacer.

4 Claims, 4 Drawing Figures

FLEXIBLE GEAR COUPLING HAVING A SHEAR SPACER AND SLEEVE CAPTURING MEANS

BACKGROUND OF THE INVENTION

1. Field of the Invention

This invention relates to flexible shaft couplings having intermeshing gear teeth and more particularly to flexible gear type couplings having a shear spacer adapted to shear when excessive torque is applied to the coupling and a capturing device for maintaining the sleeve of the coupling substantially concentric around the hub when the shear spacer shears.

2. Description of the Prior Art

In any coupling and in particular a flexible gear type coupling the function thereof is to transmit torque between a pair of substantially coaxially aligned shafts while at the same time accommodating any axial, angular, and parallel offset misalignment that exists between the shafts. The amount of torque to be transmitted by the coupling is determined by the amount that can be accepted by the shafts and the driven apparatus without any damage being done. Since couplings are relatively expensive, they are designed to transmit that torque which is to be accepted by the shafts and the driven apparatus. Should a coupling designed to transmit a small amount of torque be used between the shafts that are designed to transmit a great amount of torque, the meshing gear teeth in the flexible coupling may become damaged when excess torque is applied to the coupling.

Further, should a coupling designed to accommodate a large torque be used with a device in which only small torques are to be used, the coupling is overdesigned for the job. In addition, if a larger torque than desired is momentarily transmitted, the larger coupling will transmit it to the device which may be damaged by the excessive torque.

Even when a gear type coupling has been properly designed to take the specified amount of torque to be transmitted, it often develops that in a given situation or at a given moment in time, a torque greater than the amount designed to be transmitted through the coupling may be applied to the driving shaft. When this occurs, the meshing gear teeth of the coupling may be damaged by the excessive torque requiring the coupling to be replaced. Since it is extremely difficult to design an apparatus in which it can be assured that no excess torque will be transmitted to the driven device, couplings have been developed that contain shear pins connecting the various elements in the coupling. When an excessive torque is applied to the coupling, the shear pin shears, disconnecting the driving shaft from driven shaft thus protecting both the intermeshing gear teeth and the driven apparatus from damage. Thus only the shear pin need be replaced in the coupling rather than the entire coupling or the driven device. Such couplings utilizing shear pins are known and are shown for example in Swanson U.S. Pat. No. 2,969,661 and Hochreuter U.S. Pat. No. 3,855,818. Both Swanson and Hochreuter disclose shear pins which are installed between adjacent coupling halves and when excessive torque is applied to one coupling half, the shear pin shears preventing torque from being transmitted from one coupling half to the other coupling half.

A problem associated with shear pin flexible gear type couplings is that the sleeve of the coupling half that surrounds the hub member is generally a floating type sleeve and the only contact between the sleeve and the hub is by the outer flange of the sleeve or in some designs between the intermeshing gear teeth of the coupling hub and sleeve. Conventionally, the intermeshing gear teeth between the sleeve and hub are located at the outer ends of each coupling half. This leaves a space between the sleeve and the hub which is axially spaced from the intermeshing gear teeth. This space is normally filled with a lubricant for lubricating the intermeshing gear teeth. Such a coupling is referred to as a floating sleeve flexible gear type coupling. The sleeve remains substantially concentric about the hubs when the sleeve of the individual coupling halves are secured together for the transmission of torque. When a shear pin is disposed between the sleeves of each half coupling, the floating sleeves remain concentric as long as no excessive torque shears the shear pin. When the shear pin shears, due to excessive torque, each sleeve is free to pivot about its outer flange or the intermeshing gear teeth and to axially move relative to the hub. When this happens, the sleeves are free to whip around radially and axially until the coupling halves come to rest causing a great amount of damage to the coupling in the interim between shearing and stopping. In addition, when the shear pin shears, both coupling halves continue to rotate for a certain period of time and since the sleeves are free to radially and axially whip around, contact can occur between each sheared portion of the coupling causing damage to the sleeves which may require replacement thereof.

Both Swanson and Hochreuter have disclosed devices for maintaining the sleeve substantially concentric around the hub until the coupling has come to rest after the shear pin has sheared. Swanson utilizes a shear pin adapter interposed between the opposed sleeves on the coupling halves. The adapter is constructed in two parts of which one part is secured to each sleeve and two parts of the adapter are secured together by a shear pin. When the shear pin shears, the adapter parts rotate about each other and prevent the sleeves from whipping around radially. In addition, Swanson provides a lock washer between the heads of the shear pins and the adapter so that when the shear pins shear they separate a small amount to prevent their contact while the coupling is still rotating. Hochreuter also provides a shear pin device between the sleeves of each coupling half. However, he provides a device wherein the sleeve of one coupling half rotates about the sleeve of the other coupling half in conventional ball bearings. When the shear pin shears between the coupling sleeves, one sleeve will rotate about the other sleeve without radial or axial movement between the sleeves. Both shear pin devices of Swanson and Hochreuter maintain the sleeve about the hubs substantially concentric when the shear pin shears and Swanson provides a means of separating the shear pin pieces so they do not contact each other after shearing. However, both devices are extremely expensive, require a high degree of machining, and require a large number of parts to be added to the coupling, the cost of which is naturally passed on to the customer.

SUMMARY OF THE INVENTION

Accordingly, an object of the present invention is to provide a flexible gear type coupling that will overcome the aforementioned disadvantages and others. Thus, this invention provides an inexpensive and uncomplicated means of preventing damage to the coupling and the driven apparatus due to excessive torque being applied thereto. This invention simply and economically allows a part of the coupling to shear when excessive torque is applied thereto and maintains the sleeve of the coupling concentric around the hub of the coupling until the coupling comes to rest.

The apparatus for accomplishing the above objects is a flexible gear type coupling for connecting a pair of substantially coaxially aligned shafts for transmitting torque therebetween comprising: a hub means having external gear teeth surrounding an outer portion thereof and rotatably connected to one of the shafts; a sleeve means surrounding the hub means and having internal gear teeth surrounding an inner portion thereof and in meshing engagement with the external gear teeth; a shear spacer means connected between the sleeve means and the other of the shafts for transmitting torque from the one shaft to the other shaft; the shear spacer means being adapted to shear when excessive torque is applied thereto for protecting the coupling from damage by the excessive torque; and a capturing means interposed between the hub means and the sleeve means for maintaining the sleeve means substantially concentric about the hub means upon shearing of the shear spacer means.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
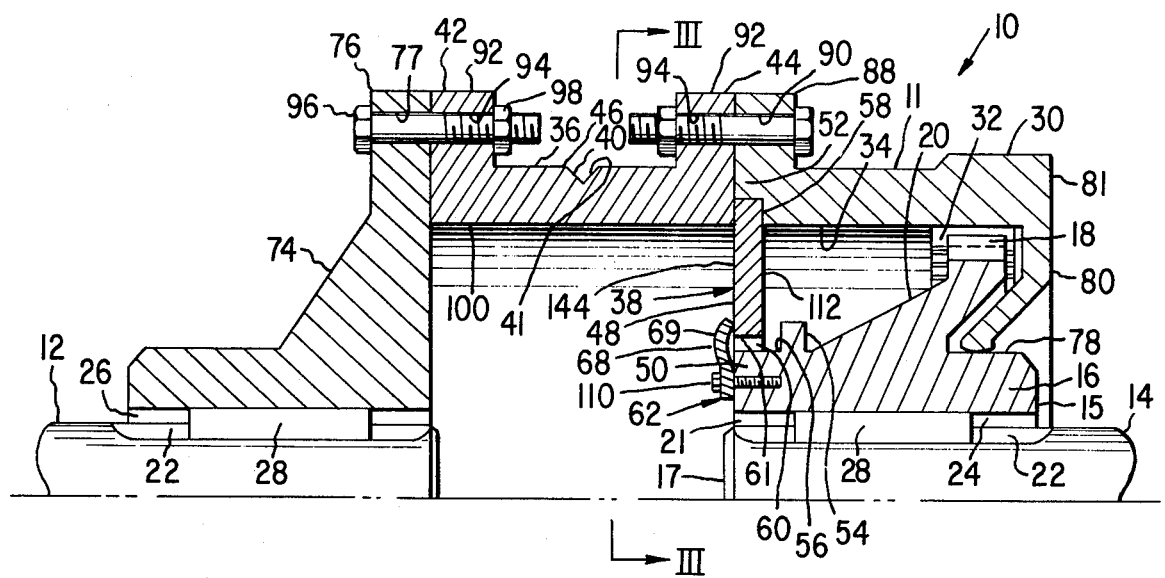
FIG. 1 is a side view in cross section of a symetrical portion of a flexible gear type coupling of the present invention showing the shear spacer means, the capturing means interposed between the sleeve and the hub of the coupling, and the spring clip means for separating the sheared portions of the shear spacer means when the shear spacer means shears.

Referring to FIG. 1, the invention generally comprises a flexible gear type coupling, denoted generally by numeral 10, for connecting a pair of substantially coaxially aligned shafts 12 and 14 to transmit torque therebetween. Coupling 10 generally comprises, in combination, a hub means 16 having external gear teeth 18 surrounding an outer portion 20 thereof and connected for rotation with shaft 14. A sleeve means 30 surrounds hub means 16 and has internal gear teeth 32 surrounding an inner portion 34 thereof in meshing engagement with external gear teeth 18 in the conventional manner. A shear spacer means 36 is connected between sleeve means 30 and the other shaft 12 for transmitting torque from shaft 12 to shaft 14. Shear spacer means 36 is adapted to shear when excessive torque is applied thereto for protecting coupling 10 from being damaged by the excessive torque. A capturing means, denoted generally by numeral 38, is interposed radially between hub means 16 and sleeve means 30 for maintaining sleeve means 30 substantially concentric about hub means 16 upon shearing of shear spacer means 36.

Figure 2:
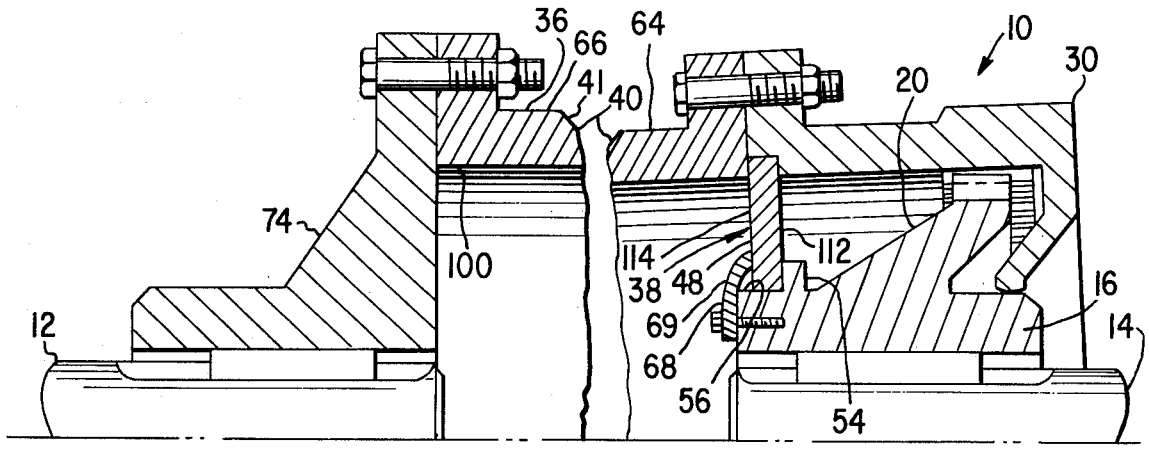
FIG. 2 is a view similar to FIG. 1 showing the configuration of the coupling when the shear spacer means has sheared.
Figure 3:
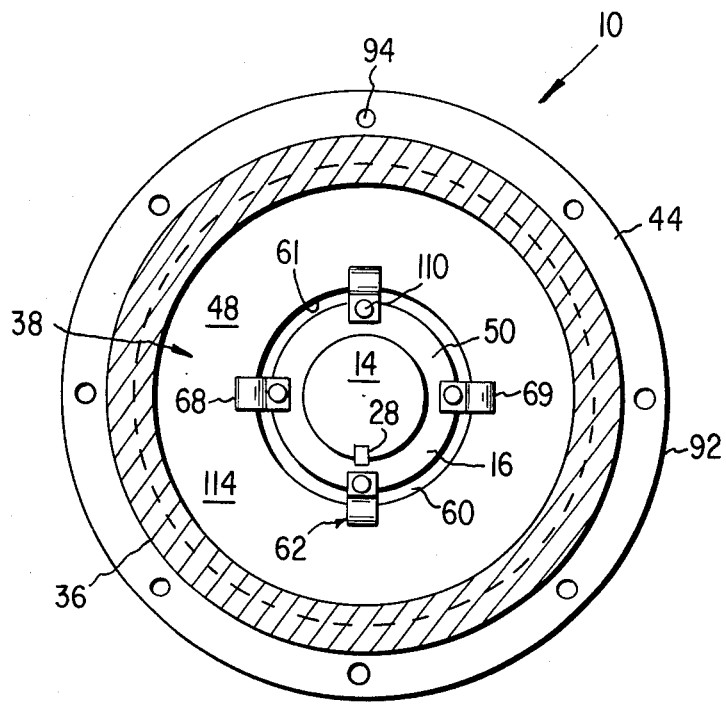
FIG. 3 is an end view in cross section of the coupling half of FIG. 1 taken along the lines III—III showing the capturing means surrounding the end portion of the hub means and the spring clip means in contact with the capturing means.
Figure 4:
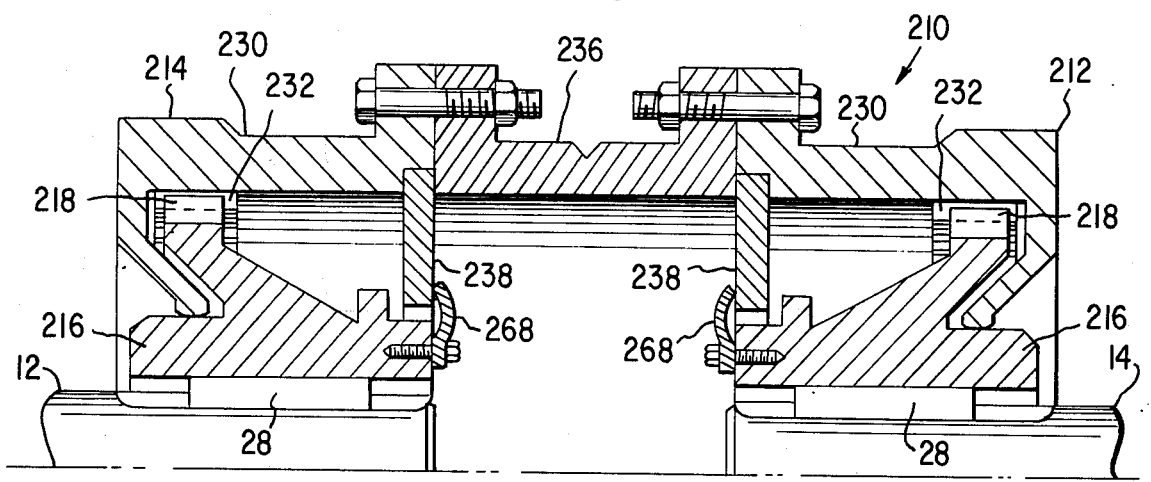
FIG. 4 is a side view in cross section of a symetrical portion of a coupling showing two coupling halves of the present invention secured between coaxially aligned shafts and the shear spacer means interconnectng the sleeve means of each coupling half.

More particularly, and referring to FIGS. 1, 2 and 3, coupling 10 is connected between the pair of coaxially aligned and rotatable shafts 12 and 14. For illustration purposes only shaft 12 will be considered the driving shaft and shaft 14 will be considered the driven shaft, however, it should be understood that either shaft may be the driving and driven shaft. Flexible coupling 10 is used between shafts 12 and 14 to accommodate any axial, angular, and parallel offset misalignment between shafts 12 and 14 and to transmit torque therebetween. In the configuration as shown in FIG. 1, coupling 10 is depicted as a half coupling 11 which is connected directly to shaft 14 and rigidly connected to shaft 12 through a shear spacer means 36 and a hub 74. Where only a small amount of angular and axial misalignment is encountered between shafts 12 and 14, a single half coupling 11 secured to shaft 14 is sufficient. If parallel offset misalignment or greater angular and axial misalignment is encountered between shafts 12 and 14, a pair of coupling halves 212 and 214 making up a full coupling (to be described later) as shown in FIG. 4 may be used.

In FIGS. 1, 2, and 3, half coupling 11 includes a hub means 16 which is secured for rotation with shaft 14. Preferably, shaft 14 includes a keyway 22 extending along the outer surface thereof to end 17. Hub 16 also includes a keyway 24 extending axially along inner surface 21 thereof. Hub 16 is installed on shaft 14 so that keyways 22 and 24 are in radial alignment. A key 28 is inserted in keyways 22 and 24 thereby rotatably securing hub means 16 to shaft 14. A second hub 74 (to be described later) is secured to shaft 12 in the same manner that hub means 16 is secured to shaft 14. That is, shaft 12 also includes a keyway 22 and hub 74 includes a keyway 26. Key 28 is inserted in keyways 22 and 26 for rotatably securing hub 74 to shaft 12.

Hub means 16 includes a plurality of external gear teeth 18 extending circumferentially around an outer portion 20 of hub means 16. Preferably, outer portion 20 extends outwardly from the body of hub means 16 as shown in FIG. 1 and external gear teeth 18 are formed as an intergral part of the outwardly extending portion of outer portion 20. Preferably, external gear teeth 18 are straight as shown in FIGS. 1 and 2 and sleeve means 30 pilots about hub means 16 by inwardly extending flange 80 (to be described later). However, if desired, gear teeth 18 can include a conventional crowned portion (not shown) so that piloting occurs between hub means 16 and sleeve means 30 through the intermeshing gear teeth 18 and 32. Preferably hub means 16 also includes a shoulder portion 78 disposed between the body of hub means 16 and outwardly extending outer portion 20 on end 15 of hub means 16. In addition, hub means 16 includes a radially extending flange 54 which is spaced axially inward from end portion 50 on hub means 16 thereby forming a shoulder portion 56 between radially extending flange 54 and end portion 50.

Sleeve means 30 surrounds hub means 16 and includes circumferentially extending internal gear teeth 32 on an inner surface 34 which are in meshing engagement with external gear teeth 18. Sleeve means 30 further includes an outwardly extending flange 88 on end 52. Flange 88 includes a plurality of axially extending openings 90 therethrough. Sleeve means 30 further includes a circumferentially extending recess 58 in inner portion 34 at end 52. Recess 58 is formed so that it is in radial alignment with shoulder portion 56 on hub means 16. Preferably, sleeve means 30 further includes an inwardly extending flange 80 formed on end 81 of sleeve 30. Flange 80 extends inwardly so it substantially abuts shoulder portion 78 of hub means 16 thereby providing piloting between sleeve means 30 and hub means 16. As shown in FIG. 1, flange 80 is preferably an integral part of sleeve means 30 and formed with an offset so that it is in contact with shoulder portion 78. Although this is the preferred manner of constructing flange 80, it should be understood, however, that the flange 80 may be made as a separate part and secured to end 81 of sleeve 30 such as by screws (not shown). In addition, flange 80 need not be offset as shown in FIG. 1 but hub means 16 may extend axially beyond sleeve means 30 and flange 80 may then be straight. If gear teeth 18 are crowned (not shown) so piloting occurs between intermeshing gear teeth 18 and 32 rather than between flange 80 and hub means 16, flange 80 is spaced from shoulder portion 78 and may include a circumferentially extending groove (not shown) formed on the inner periphery thereof and in radial alignment with shoulder portion 78 of hub means 16. A conventional sealing ring (not shown) may be seated within the groove so that it is in sealing engagement with the sides of the groove and in sealing engagement with shoulder portion 78 of hub means 16 thus preventing foreign material from entering coupling half 11 and to prevent lubricant within coupling half 11 from escaping to the outside. The radial depth of the groove is made greater than the radius of the sealing ring so that a space (not shown) is formed between the end of the groove and the sealing ring. Thus, sleeve means 30 may radially deflect about hub means 16 to accommodate misalignment between shafts 12 and 14.

Hub 74, which is secured to shaft 12, includes an outwardly extending flange 76 having substantially the same diameter as flange 88 of sleeve 30. Flange 76 further includes a plurality of circumferentially spaced and axially extending openings 77 therethrough.

Coupling 10 further includes a shear spacer means 32 which is secured between sleeve means 30 and hub 74 for rotatably connecting shaft 12 to shaft 14 through coupling half 11. Shear spacer means 36 includes a pair of outwardly extending flanges 92 on outer surface 46 at ends 42 and 44. Each flange 92 on ends 42 and 44 includes a plurality of axially extending openings 94 in axial alignment with openings 90 in flange 88 of sleeve means 30 and with openings 77 in flange 76 of hub 74. Bolts 96 extend through openings 77 of hub 74 and 94 of shear spacer means 36 and openings 90 of sleeve means 30 and 94 of shear spacer means 36. Nuts 98 are secured on the ends of bolts 96 thereby securing shear spacer means 36 between hub 74 and sleeve means 30. Shear spacer means 36 includes a circumferentially extending inner portion 11 which has a diameter substantially the same as inner portion 34 of sleeve means 30. Shear spacer means 36 further includes a shearing section 40 formed on the outer surface 46 thereof and substantially centered between end portions 42 and 44. Preferably, shearing section 40 includes a circumferentially extending V-notch or tapered groove 41 providing a reduced cross sectional area around outer surface 46. The depth of tapered groove 41 will depend upon the amount of torque that can be transmitted from shaft 12 to shaft 14 without shearing shear spacer means 36. Although groove 41 has been shown on outer surface 46 of shear spacer means 36, groove 41 may also be formed on inner surface 100 or a pair of radially aligned grooves (not shown) may be formed on both surfaces 46 and 100.

Referring to FIG. 2, when excessive torque is applied to coupling 10, shear spacer means 36 will shear at shearing section 40. The shear spacer means 36 will break at groove 41 as shown in FIG. 2 forming two sheared portions 64 and 66. Sheared portion 66 will remain secured to hub 74 and sheared portion 64 will remain secured to sleeve means 30. However, since the sheared spacer means 36 has sheared forming sheared portions 64 and 66, shaft 12 will no longer be connected to shaft 14 through shear spacer means 36 and any torque which is being transmitted by shaft 12 will no longer be transmitted to shaft 14 or vice versa.

Referring to FIGS. 1, 2, and 3, coupling 10 further includes a capturing means 38 located between inner portion 34 of sleeve means 30 and shoulder portion 56 of hub means 16. Capturing means 38 is used to maintain sleeve 30 substantially concentric around hub means 30 when shear spacer means 36 shears at shearing section 40 as shown in FIG. 2 preventing sleeve means 30 from violently whipping around hub means 16 while coupling 10 is still rotating and thereby preventing undue damage to coupling 10. Sleeve means 30 is maintained substantially concentric around hub means 16 because there are now two axially spaced contact points between hub means 16 and sleeve means 30 instead of one contact point, that is, flange 80 and shoulder portion 78 of hub means 16 comprising one point and capturing means 38 comprising another. Capturing means 38 preferably is an annular ring 48 having an outer diameter substantially the same as the diameter of recess 58 formed in end 52 of sleeve means 30. In addition, annular ring 48 preferably has an axial width substantially the same as the width of recess 58 but smaller than the axial distance between end 50 of hub means 16 and flange 54. Annular ring 48 includes an axially extending central opening 61 having a diameter somewhat greater than the diameter of shoulder portion 56 of hub means 16. Annular ring 48 fits within recess 58 so that surface 114 on annular ring 48 abuts end portion 44 of shear spacer means 36 and surface 112 of annular ring 48 abuts sleeve means 30. Thus, central opening 61 of annular ring 48 surrounds shoulder portion 56 forming a spacer 60 therebetween. Spcae 60 is needed between shoulder portion 56 and annular ring 48 to accommodate misalignment between shafts 12 and 14. It should be understood that space 60 should be kept as small as possible to keep sleeve means 30 as concentric as possible around hub means 16 when shear spacer means 36 shears as shown in FIG. 2.

Referring now to FIGS. 1, 2, and 3, if desired coupling 10 may include a plurality of separating means, denoted generally by numeral 62, for axially separating sheared portions 66 and 64 of sheared spacer means 36 upon shearing of shear spacer means 36 to prevent sheared portions 66 and 64 from contacting each other while hub 74 and coupling half 11 are still rotating thus preventing damage to coupling 10. Preferably, separating means 62 is a plurality of spring steel clips 68 which are secured by screws 110 to end portion 50 of hub means 16 so that a portion 69 of spring clip 68 is in contact with surface 114 of annular ring 68. When spring clip 68 is secured to end portion 50, portion 69 is placed in compression against surface 114 of annular ring 48. Thus, when shear spacer means 36 shears, spring clips 68 will force sheared portion 64 away from sheared portion 68 until surface 112 of annular ring 48 is in abutting contact with flange 54 of hub means 16. In addition, when shear spacer means 36 shears, annular ring 48 will fall the distance of space 60 upon shoulder portion 56 of hub means 16 thereby keeping sleeve means 30 substantially concentric around hub means 16.

Although spring clips 68 are preferred as separating means 62, other devices which are placed in compression and will separate shear portion 64 from sheared portion 66 may be used. For example, belville disc springs secured to end portion 50 of hub means 16 so that the concave portion of the disc spring is facing surface 114 of annular ring 48. Thus when the belville disc springs are secured to hub means 16 with a portion thereof in contact with surface 114 of annular ring 48, compression is applied to annular ring 48.

FIG. 4 illustrates a coupling 210 for connecting a pair of coaxially aligned rotatable shafts 12 and 14 where a large amount of axial and annular misalignment is encountered or where parallel offset misalignment is encountered between shafts 12 and 14. For illustration purposes only, shaft 12 will be considered the driving shaft and shaft 14 will be considered the driven shaft. However, it should be understood that either shaft 12 or 14 may be the driving or driven shaft. Coupling 210 generally comprises a first coupling half 212 rotatably secured to shaft 14 in the same manner as described for coupling half 11 of FIG. 1 and a second coupling half 214 secured to shaft 12 in the same manner as hub 74 is secured to shaft 12 in FIG. 1. Coupling halves 212 and 214 include a hub means 216 connected to each respective shaft 12 and 14 and each hub means 216 has outwardly extending gear teeth 218. A sleeve means 230 surrounds each hub means 216 of first and second coupling halves 212 and 214 and has inwardly extending gear teeth 232 in meshing engagement with outwardly extending gear teeth 218. Each coupling half 212 and 214 is constructed exactly the same as coupling half 11 of coupling 10 shown in FIG. 1 and previously described. Therefore, construction of each coupling half 212 and 214 will not be further described. Coupling 210 further includes a shear spacer means 236 connected between each sleeve means 230 on first and second coupling halves 212 and 214 and is adapted to shear between the ends of the shear spacer means 236 when excessive torque is applied between the driving shaft 12 and the driven shaft 14. Shear spacer means 236 is constructed in the same manner as shear spacer means 36 described in FIG. 1 and therefore will not be further described. A ring means 238 is interposed between each sleeve means 230 and each hub means 216 in first and second coupling halves 212 and 214 for retaining each sleeve means 230 substantially symmetrical around each hub means 216 upon shearing of shear spacer means 236. Retaining ring 238 is constructed in the same manner as capturing means 38 of FIG. 1 and will not be further described. Coupling 210 may further include a plurality of spring means 269 secured to each hub means 216 and in contact with each ring means 238 to axially separate each sleeve means 230 on first and second coupling halves 212 and 214 upon shearing of shear spacer means 236. Spring means 268 is constructed in the same manner as separating means 62 as described in FIG. 1 and therefore will not be further described.

In operation and referring to FIGS. 1, 2, and 3, coupling half 11 is secured to shaft 14 and hub 74 is secured to shaft 12 in the manner previously described. Shear spacer means 36 is secured between sleeve 30 and hub 74 in the manner as previously described. For illustration purposes only, shaft 12 will be considered the driving shaft and shaft 14 will be considered the driven shaft. Shaft 12 is connected to an apparatus (not shown) that is to drive shaft 12 such as, for example, a motor (Not shown). Shaft 14 is connected to the apparatus (not shown) that is to be driven. As the motor connected to shaft 12 is energized, it rotates shaft 12. Shaft 12 transmits torque through hub 74, which is rotatably secured to shaft 12, to shear spacer means 36 through bolts 96. Shear spacer means 36 transmits torque to sleeve means 30 through bolts 96. Sleeve means 30 transmits torque to hub means 16 through intermeshing gear teeth 32 and 18. Hub means 16 transmits torque to shaft 14 through key 28. Shaft 14 then rotates and transmits torque to the apparatus to be driven. Should a torque be applied to shaft 12 that is in excess of the torque that can be safely transmitted to the driven apparatus or transmitted by coupling 10, shear spacer means 36 will shear at shearing section 40.

Referring now to FIG. 2, when excessive torque has been applied to shaft 12, shear spacer means 36 will shear separating the shear spacer means 36 into two sheared portions 64 and 66. Sheared portion 64 will remain secured to sleeve means 30 and sheared portion 66 will remain secured to hub 74. As shear spacer means 36 shears, spring clips 68, if used, which are in compression against surface 114 of annular ring 48, pushes annular ring 48 axially until surface 112 is abutting flange 54 of hub 16. Since annular ring 48 is secured in recess 58, annular ring 48 also moves sleeve means 30 and sheared portion 64 of shear spacer means 36 axially away from sheared portion 66 and hub 74. Spring clip 68 pushes against annular ring 48 until surface 112 of annular ring 48 comes in contact with flange 54. In addition, since there is a slight space 60 above shoulder portion 56 of hub 16 and annular ring 48, annular ring 48 will drop the distance of space 60 until annular ring 48 is in contact with shoulder portion 56. It is to be emphasized that space 60 between annular ring 48 and shoulder portion 56 is to be kept to a minimum so sleeve 30 will remain substantially concentric around hub means 16 as shown in FIG. 2. When space 60 is kept to a minimum, the slight dropping of annular ring 48 and sleeve 30 onto shoulder portion 56 will not be detrimental to coupling half 11 as coupling 11 continues to rotate until stopped. Once shear spacer means 36 has sheared, the two sheared portions 64 and 66 can be removed by removing bolts 96 and nuts 98 and then replacing the sheared portions 64 and 66 with a new shear spacer means 36.

Referring to FIG. 4, the operation of coupling 210 shown in FIG. 4, in which there are two coupling halves 212 and 214, is exactly the same as that shown for coupling 10 and previously described for FIG. 1. The only difference is that when shear spacer means 236 shears and spring means 268 are used both sleeves 230 of each half coupling 212 and 214 axially move away from each other by the action of spring means 268 secured to each hub means 216. In this manner, both sleeves 230 of half coupling 212 and 214 will remain substantially concentric about each hub 216.

The foregoing has presented a novel, inexpensive, and uncomplicated flexible coupling for connecting a pair of coaxially aligned shafts. The problem of excessive torque being transmitted from one shaft to the other and damaging the apparatus to be run or the coupling has been eliminated by interposing a shear spacer between at least one coupling half secured to one shaft and the other shaft. When excessive torque is transmitted, the shear spacer means will shear disengaging the one shaft from the other shaft thus preventing excessive torque from being transmitted. In addition, the problem of the sleeve of the coupling flying wildly about the hub when the shear spacer has sheared has been eliminated by interposing a capturing ring between the sleeve and the hub for holding the sleeve substantially concentric around the hub until the coupling comes to rest. An additional advantage can be provided by the spring clips that move the sheared portions away from each other to prevent fragments of metal from being sheared off and thrown centrifugally outward from the coupling.

Accordingly, the invention having been described in its best embodiment and mode of operation, that which is desired to be claimed by Letters Patent is:

1. A flexible gear type coupling for connecting a pair of substantially coaxially aligned shafts to transmit torque therebetween, comprising:
   a hub means having external gear teeth surrounding an outer portion thereof and rotatably connected to one of said shafts,
      said hub means including a radially outwardly extending flange axially spaced from an end portion of said hub means forming a shoulder portion between said flange and said end portion;
   a sleeve means surrounding said hub means and having internal gear teeth surrounding an inner portion thereof and in meshing engagement with said external gear teeth,
      said sleeve means including a circumferentially extending recess around said inner portion of said sleeve means and in radial alignment with said shoulder portion;
   a shear spacer means connected between said sleeve means and the other of said shafts for transmitting torque from said one shaft to said other shaft,
   said shear spacer means being adapted to shear when excessive torque is applied thereto for protecting said coupling from damage by said excessive torque;
   a capturing means interposed between said hub means and said sleeve means for maintaining said sleeve means substantially concentric about said hub means upon shearing of said shear spacer means,
      said capturing means comprising an annular ring secured in said recess and extending radially inwardly therefrom and surrounding said shoulder portion in close proximity thereto for axial abuttment with said radially outwardly extending flange; and
   a separating means for axially separating sheared portions of said shear spacer means upon shearing thereof to prevent contact between said sheared portions while said coupling is rotating.

2. The flexible gear coupling of claim 1 wherein said separating means includes a plurality of compression spring clips secured to said hub means and in abutting contact with said annular ring so that, upon shearing of said shear spacer means, said spring clips to move said ring means axially against said flange thereby separating said sleeve means and one of said sheared portions of said spacer means from the other of said sheared portions.

3. A flexible gear type coupling for connecting a pair of substantially coaxially aligned shafts to transmit torque therebetween, comprising:
   a hub means having external gear teeth surrounding an outer portion thereof and rotatably connected to one of said shafts;
   a sleeve means surrounding said hub means and having internal gear teeth surrounding an inner portion thereof and in meshing engagement with said external gear teeth;
   a shear spacer means connected between said sleeve means and the other of said shafts for transmitting torque from said one shaft to said other shaft,
   said shear spacer means being adapted to shear when excessive torque is applied thereto for protecting said coupling from damage by said excessive torque;
   a capturing means interposed between said hub means and said sleeve means for maintaining said sleeve means substantially concentric about said hub means upon shearing of said shear spacer means; and
   a separating means for axially separating sheared portions of said shear spacer means upon shearing thereof to prevent contact between sheared portions while said coupling is rotating.

4. A flexible gear type coupling for connecting a pair of substantially coaxially aligned driving and driven shafts, comprising:
   first and second coupling halves connected to said driving and driven shafts respectively for rotation therewith, said first and second coupling halves each including:
      hub means connected to said respective shaft and having outwardly extending gear teeth; and
      sleeve means surrounding said hub means and having inwardly extending gear teeth in meshing engagement with said outwardly extending gear teeth;
   a shear spacer means connected between each of said sleeve means on said first and second coupling halves and adapted to shear between the ends of said shear spacer means when excessive torque is applied between said driving and driven shafts;
   ring means interposed between each of said sleeve means and each of said hub means in said first and second coupling halves for retaining each of said sleeve means substantially symmetrical around each of said hub means upon shearing of said shear spacer means; and
   spring means secured to each of said hub means and in contact with each of said ring means to axially separate said sleeve means on said first and second coupling halves upon shearing of said shear spacer means.

* * * * *